(12) United States Patent
Royle et al.

(10) Patent No.: US 12,223,772 B2
(45) Date of Patent: Feb. 11, 2025

(54) SYSTEMS, DEVICES, AND METHODS FOR PEDESTRIAN TRAFFIC ASSESSMENT

(71) Applicant: PIVOT ANALYTICS, LLC, Washington, DC (US)

(72) Inventors: William Royle, Silver Spring, MD (US); Wayne Mitzen, Manassas, VA (US); David Dochter, Washington, DC (US); Matthew Alexander, Rockville, MD (US)

(73) Assignee: PIVOT ANALYTICS, LLC, Washington, DC (US)

( * ) Notice: Subject to any disclaimer, the term of this patent is extended or adjusted under 35 U.S.C. 154(b) by 422 days.

(21) Appl. No.: 17/570,983

(22) Filed: Jan. 7, 2022

(65) Prior Publication Data
US 2023/0222840 A1    Jul. 13, 2023

(51) Int. Cl.
G06V 40/20    (2022.01)
G06T 7/246    (2017.01)
H04N 7/18     (2006.01)

(52) U.S. Cl.
CPC .............. *G06V 40/20* (2022.01); *G06T 7/246* (2017.01); *H04N 7/181* (2013.01); *G06T 2207/10016* (2013.01); *G06T 2207/30196* (2013.01)

(58) Field of Classification Search
CPC ...... G06V 40/20; G06V 40/103; G06V 40/52; H04N 7/181; H04N 7/188; G06T 2207/10016; G06T 2207/30196; G06T 2207/30242
See application file for complete search history.

(56) References Cited

U.S. PATENT DOCUMENTS

| | | | |
|---|---|---|---|
| 10,657,746 B1 * | 5/2020 | Munir | G06V 20/53 |
| 11,087,513 B1 * | 8/2021 | Duan | G06T 11/60 |
| 2010/0158352 A1 * | 6/2010 | Yu | H04N 5/2224 382/206 |
| 2014/0218378 A1 * | 8/2014 | Roh | G06T 1/60 345/519 |
| 2021/0049381 A1 * | 2/2021 | Ju | B60W 30/095 |
| 2023/0214000 A1 * | 7/2023 | Dewey | G06F 1/3212 713/324 |

* cited by examiner

*Primary Examiner* — Kathleen V Nguyen
(74) *Attorney, Agent, or Firm* — MEDLER FERRO WOODHOUSE & MILLS PLLC

(57) ABSTRACT

Systems, devices, and methods for pedestrian footfall counting are provided. The system includes a plurality of pedestrian footfall counting devices configured to capture and record optical data of pedestrians. The system further includes one or more relay servers configured to receive the optical data from the pedestrian footfall counting devices. The system further includes one or more counting servers configured to process the optical data and determine a pedestrian footfall count based on the optical data.

11 Claims, 10 Drawing Sheets

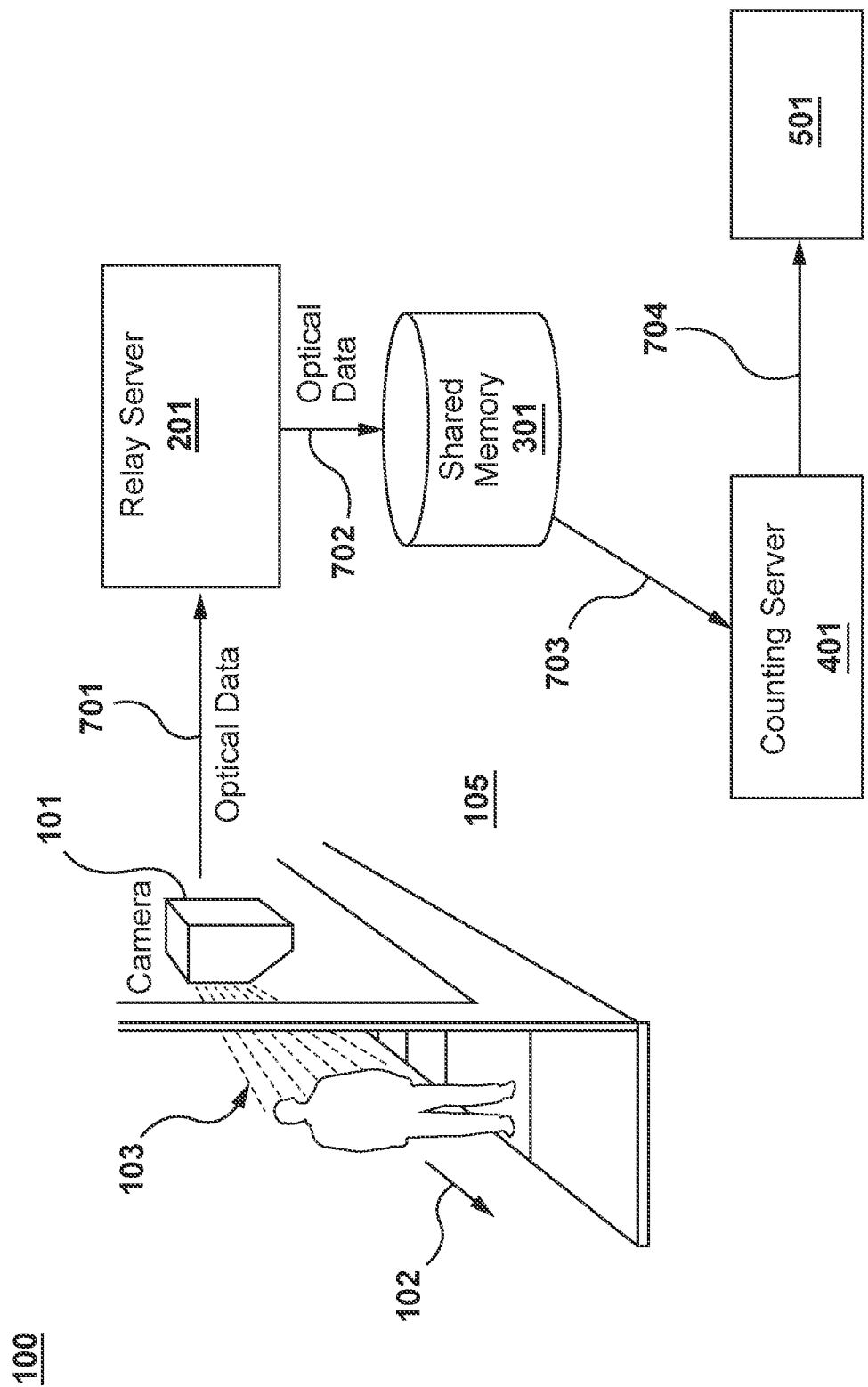

SYSTEMS, DEVICES, AND METHODS FOR PEDESTRIAN TRAFFIC ASSESSMENT

TECHNICAL FIELD

The present disclosure generally relates to systems, devices, and methods for pedestrian foot traffic assessment.

BACKGROUND

Obtaining accurate footfall data in urban areas is difficult and expensive. Some solutions include GPS based solutions, IR beam counters, hand counting, and others. Footfall data may provide value in several areas, including, for example, commercial real estate. Accurate knowledge of foot traffic in a given area or space may inform decision making processes regarding commercial sites. GPS based solutions suffer from inaccuracy, due to the fact that a large margin of error exists in where exactly a person is located. GPS has additional issues penetrating buildings, further compounding inaccuracy. It may be difficult to distinguish between a person in an office and a person on the road below with GPS. Finally, GPS is not accurate enough to determine which side of the road a person is on. IR beam counters are inexpensive, but inaccurate. These devices cannot distinguish between a single person passing, or two or more people passing side by side. Hand counting is another solution. Hand counting is also expensive, as paying a person to count passersby becomes expensive over a long period of time. Additionally, counters may have a tendency to become distracted, leading to data which is less accurate than expected. Although AI and video based counting solutions exist, such systems are typically prohibitively expensive due to drawbacks, discussed below, in the structure of the counting devices and computing devices.

Accordingly, lower cost and higher accuracy footfall counting methods for urban areas are thus desired.

SUMMARY

The present disclosure generally relates to systems, devices, and methods for quantifying levels of pedestrian foot traffic.

Systems disclosed herein provide a hardware device incorporating an optical recognition device (e.g., a recording device) configured for positioning to face a sidewalk or other area for which counts are desired. The recording device is configured to transmit optical data to a remote relay server. The relay server is configured to receive the optical data and transmit the optical data to shared memory. A counting server is configured to obtain the optical data from the shared memory, and then process the optical data to obtain footfall counts.

In an embodiment, a pedestrian footfall recording device is provided. The pedestrian footfall recording device includes a housing; an optical recognition device; a controller configured to record and store optical data captured by the optical recognition device; and a transmission device configured to access the optical data and transmit the optical data to a server.

In an embodiment, a computer implemented method of quantifying pedestrian footfall is provided. The method is configured to be carried out by a counting server including a CPU core with multithreading capability operating a plurality of CPU threads, and a GPU. The method includes obtaining by a first optical processing thread of the plurality of CPU threads a first optical data block; determining, by the first optical processing thread, a scene change in the first optical data block; requesting, by the first optical processing thread, that a GPU management thread of the plurality of CPU threads allocate GPU resources for analysis of a first optical frame associated with the scene change; identifying, by the GPU, a feature of interest in the first optical frame; tracking, by the first optical processing thread, the feature of interest in optical frames subsequent to the first optical frame; and incrementing, by the first optical processing thread, an FOI count responsive to the feature of interest crossing a predetermined point in one of the optical frames.

In an embodiment, a pedestrian footfall quantification system is provided. The pedestrian footfall quantification system includes a plurality of pedestrian footfall recording devices configured to: obtain optical data and transmit the optical data; a relay server configured to: receive the optical data transmitted by the plurality of pedestrian footfall recording devices; store the optical data in a storage device; a counting server configured to: obtain the optical data from the storage device; and process the optical data to obtain a count of features of interest in the optical data.

Other aspects and advantages of the disclosure will become apparent from the following detailed description, taken in conjunction with the accompanying drawings, which illustrate by way of example, the principles of the disclosure.

BRIEF DESCRIPTION OF THE DRAWINGS

FIG. 1A illustrates a pedestrian footfall quantification system consistent with embodiments herein.

DETAILED DESCRIPTION

Figure 1B:
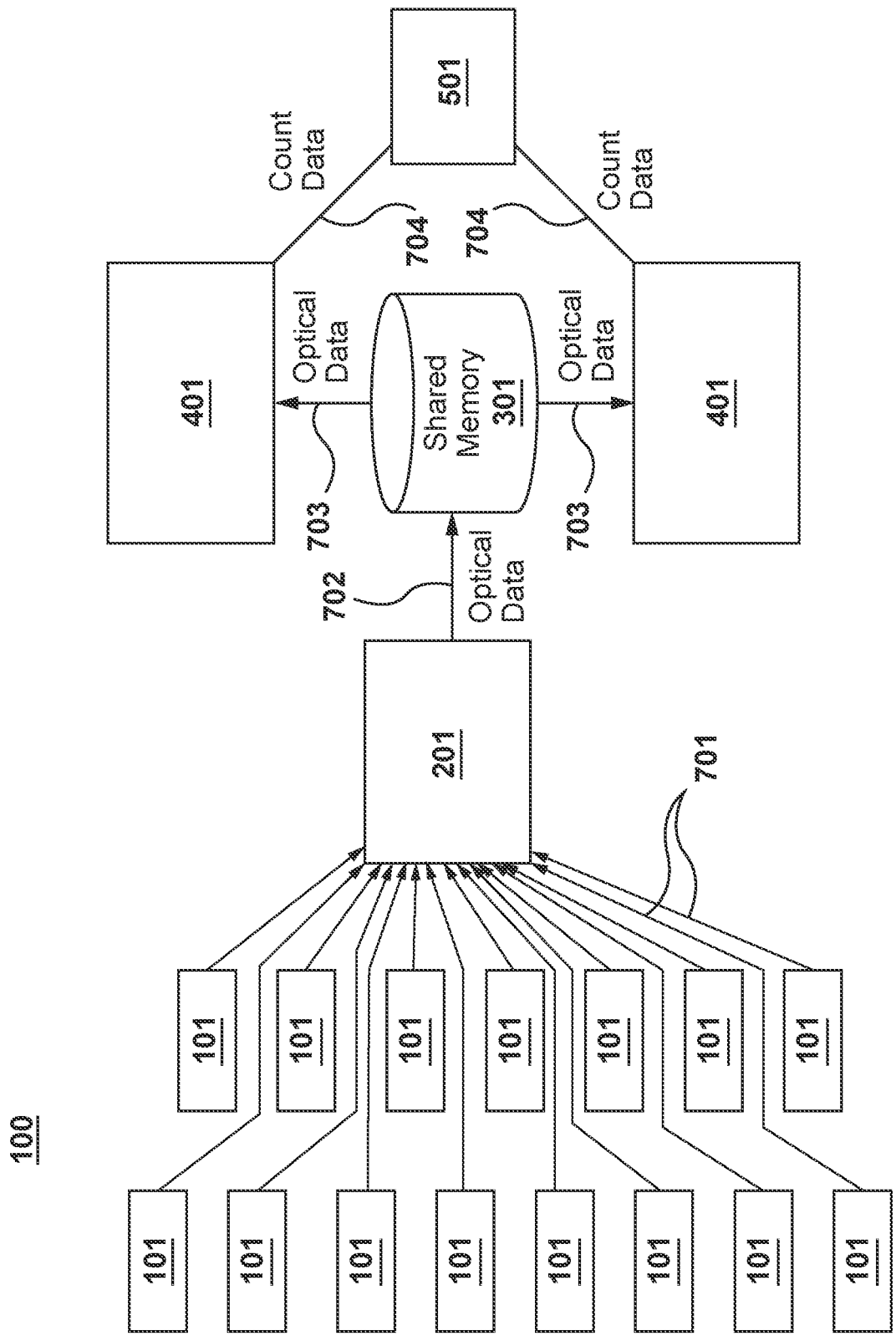
FIG. 1B illustrates network aspects of a pedestrian footfall quantification system consistent with embodiments herein.

The following disclosure describes various embodiments that describe a system, devices, and methods configured for pedestrian footfall assessment.

The systems and methods described herein provide improvements to existing footfall assessment technologies as follows. Some techniques for footfall assessment include location data based technologies, beam counters, and video based techniques.

Location based technologies may include, for example, mobile device location technologies, such as cellular location and GPS positioning. These techniques suffer from low resolution and inaccuracy in dense urban locations, due to limits in GPS accuracy and cellular location techniques. For example, it is difficult to tell what side of the road a person is on, whether they are inside/outside of a building, inside or outside of a car, etc.

Beam counting techniques, IR based, laser based, etc., operate by projecting a light beam across a region of interest, into a receiver. When the beam is interrupted, e.g., by a person crossing the beam path, the counter is incremented. Problems may arise when multiple people pass walking side by side—a single person is counted. Thus, beam counting techniques frequently lack accuracy.

Video based counting techniques typically operate with processors or hardware for counting integrated with the counting units themselves. Some providers may offer video based footfall counters which quantify the number of people who pass the counters by processing video on the devices themselves. This necessitates the incorporation of high-cost GPUs (Graphical Processing Units) to perform the AI processing needed to obtain counts from the optical data. This solution has significant drawbacks, cost (from the embedded GPUs in the counters), inflexibility (due to the difficulty of changing the GPU on an installed counter as technology advances), power consumption (embedded GPUs may draw a large amount of power), and size (the space required to operate the required hardware may be prohibitive).

Systems and methods address these drawbacks and provide additional advantages over existing technologies. In particular, as discussed in greater detail below, systems and methods discussed herein provide a modular approach to footfall counting, by employing relatively low cost and low power optical recognition devices configured to obtain and transmit video data and centralizing and optimizing the computing power necessary to process the video data to obtain accurate footfall counts. Technologies discussed herein further include various aspects configured for and adapted to facilitate and/or take advantage of the modular centralized footfall counting system.

The following disclosure refers to various computer based technologies, including processors, memories, networks, etc. Systems described herein may include one or more processors (also interchangeably referred to herein as processors, processor(s), or processor for convenience), one or more storage device(s) or computer memories, and/or other components. In other embodiments, the functionality of the processors described herein may be performed by hardware (e.g., through the use of an application specific integrated circuit ("ASIC"), a programmable gate array ("PGA"), a field programmable gate array ("FPGA"), etc.), or any combination of hardware and software. The storage devices and memories discussed herein may include any type of non-transitory computer readable storage medium (or media) and/or non-transitory computer readable storage device. Such computer readable storage media or devices may store computer readable program instructions for causing a processor to carry out one or more methodologies described here. Examples of the computer readable storage medium or device may include, but is not limited to an electronic storage device, a magnetic storage device, an optical storage device, an electromagnetic storage device, a semiconductor storage device, or any suitable combination thereof, for example, such as a computer diskette, a hard disk, a solid state storage device (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, but not limited to only those examples.

The processors may be programmed by one or more computer program instructions stored on the storage devices. For example, processors described herein are described as being programmed to execute instructions of one or more managers. It will be understood that the functionality of the various managers as discussed herein is representative and not limiting. Additionally, the storage devices may act as a data retention system to provide data storage in addition to their role in storing computer instructions. As used herein, for convenience, the various "managers" will be described as performing operations, when, in fact, the managers program the processors to perform the described operations.

Unless otherwise specified, the one or more servers and/or clients discussed herein may be configured as servers (e.g., having one or more server blades, processors, etc.), personal computers (e.g., a desktop computer, a laptop computer, etc.), smartphones, tablet computing devices, and/or other devices that can be programmed to interface according to the description provided herein.

The computer memory and storage systems described herein may include any type of computer readable storage medium (or media) and/or a computer readable storage device. Such computer readable storage medium or device may be configured to store and provide access to data. Examples of computer readable storage medium or device may include, but is not limited to, an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick.

Networks and transmission pathways described herein may include via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. Wireless standards may use various channel access methods, e.g., FDMA, TDMA, CDMA, or SDMA. In some embodiments, different types of data may be transmitted via different links and standards. In other embodiments, the same types of data may be transmitted via different links and standards. Network communications may be conducted via any suitable protocol, including, e.g., http, tcp/ip, udp, ethernet, ATM, etc.

Networks described herein may include any type and/or form of network. The geographical scope of the network may vary widely and the networks described may be a personal area network (PAN), a local-area network (LAN), e.g., Intranet, a metropolitan area network (MAN), a wide area network (WAN), or the Internet. The topology of the network may be of any form and may include, e.g., any of the following: point-to-point, bus, star, ring, mesh, or tree. The network may be of any such network topology as known to those ordinarily skilled in the art capable of supporting the operations described herein. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv4), or the link layer. The network may be a type of broadcast network, a telecommunications network, a data communication network, or a computer network.

FIG. 1A illustrates a pedestrian footfall quantification system consistent with embodiments herein. In embodiments, the pedestrian footfall quantification system 100 includes a pedestrian footfall recording device 101, a relay server 201, a shared memory 301, and a counting server 401. In embodiments, the pedestrian footfall quantification system 100 may include one or more of each of these systems, as discussed further below. In a brief overview, the pedestrian footfall quantification system 100 may operate as follows.

The pedestrian footfall recording device 101 may be installed inside of a structure (e.g., a building) with an exterior field of view 103. The exterior field of view 103 may be achieved by locating the optical recognition device on a glass (or other transparent material) window 105. The pedestrian footfall recording device 101 is configured to capture and store optical data from the field of view 103. Optical data may include, for example, video data and/or image data. In embodiments, video data may be captured at 1 FPS, 5 FPS, 10 FPS, 30 FPS, etc. In further embodiments, the optical data may include repetitively captured images. As pedestrians 102 pass through the field of view 103, images and/or video of the pedestrians 102 may be captured as optical data by the optical recognition device. The pedestrian footfall recording device 101 transfers the optical data via a transmission pathway 701 to the relay server 201. The relay server 201 receives the optical data and transfers it to a shared memory 301 via a transmission pathway 702 where it is stored. The counting server obtains the optical data from the shared memory 301 via a transmission pathway 703. The counting server 401 processes the optical data to produce count data and transmits the count data to a client 501 via the transmission pathway 704. In some embodiments, the optical data may be processed, e.g., compressed at the pedestrian footfall recording device 101.

The optical data captured by the pedestrian footfall recording device 101 and transmitted via multiple devices to the counting server 401 may be filtered, compressed, or otherwise processed by one or more devices in the transmission pathway (e.g., the relay server 201). Thus, the optical data obtained by the counting server 401 may not be identical to the optical data captured by the pedestrian footfall recording device 101. Processing performed on the optical data in the transmission pathway, however, does not change the essential nature of the optical data with respect to the visual capture of pedestrians 102 moving in the field of view 103.

In embodiments, pedestrian footfall recording devices 101 consistent with the disclosure may not be configured to analyze recorded optical data. The controller 151 may be configured to facilitate the reception, storage, and transmission of the optical data, (potentially including compression, filtering, etc.) but may be configured not to analyze the content of the recorded optical data. As discussed above, by using a controller 151 configured not to analyze the content of the recorded optical data (e.g., not to count pedestrians in the recorded optical data), the controller 151 may be selected so as to have the appropriate processing capacity/capability to only receive, store, and transmit the optical data. Accordingly, cost (by using less expensive controllers 151) and power consumption (by performing fewer tasks) by the pedestrian footfall recording devices 101 may be reduced. As further discussed below, the optical analysis tasks may be carried out by other devices after transmission of the unanalyzed optical data. Thus, the controller 151 may be configured to transmit or cause transmission of the optical data prior to analysis of the optical data taking place.

FIG. 1B illustrates network aspects of a pedestrian footfall quantification system consistent with embodiments herein. In an embodiment, the pedestrian footfall quantification system 100 includes a plurality of pedestrian footfall recording devices 101. The plurality of pedestrian footfall recording devices 101 each capture and optionally store optical data, which is subsequently transmitted to the relay server 201 via the transmission pathways 701. The relay server 201 transfers the optical data to the shared memory 301 via the transmission pathway 702. The shared memory 301 is accessible with read/write access by both the relay server 201 and one or more counting servers 401. The counting server(s) 401 obtain the optical data from the shared memory 301 via the transmission pathway 703, perform a pedestrian counting operation to obtain count data, and transmit the count data to the client 501 via the transmission pathway 704.

Each counting server 401 may process optical data obtained by one or more of the plurality of pedestrian footfall recording devices 101. In embodiments, the optical data produced by a given pedestrian footfall recording device 101 may be processed by a single counting server 401. Count data from that specific pedestrian footfall recording device 101 may be produced and transmitted to the client 501 along with count data from other pedestrian footfall recording devices 101 generated by the counting server 401. Thus, the client 501 may receive count data from the multiple counting servers 401, where the subsets of pedestrian footfall recording devices 101 associated with each counting server 401 is exclusive with no overlap. The client 501 may then aggregate the received count data to provide a complete picture of an area to a user. In further embodiments, data from a specific pedestrian footfall recording device 101 may be processed by any one of multiple counting servers 401 included in the pedestrian footfall quantification system 100, including multiple different counting servers 401 processing optical data blocks from a single pedestrian footfall recording device 101. In such embodiments, the client 501 may aggregate the data from the multiple counting servers 401 according to the pedestrian footfall recording devices 101 which captured the optical data.

FIG. 1B illustrates an example embodiment of a pedestrian footfall quantification system 100 including 15 pedestrian footfall recording devices 101, one relay server 201, one shared memory 301, and two counting servers 401. In further embodiments, more or fewer of each device or server may be provided as appropriate. For example, in some applications, more pedestrian footfall recording devices 101 may be required. In such an embodiment, an appropriate number of additional relay servers 201, shared memories 301, and counting servers 401 may further be provided. FIG. 1B is a representative example only of the structure and hierarchy of a pedestrian footfall quantification system 100. In practice, pedestrian footfall quantification system 100 consistent with embodiments herein may include any suitable number of devices and servers. Further details of the devices and servers of the pedestrian footfall quantification system 100 are provided below.

Figure 2A:
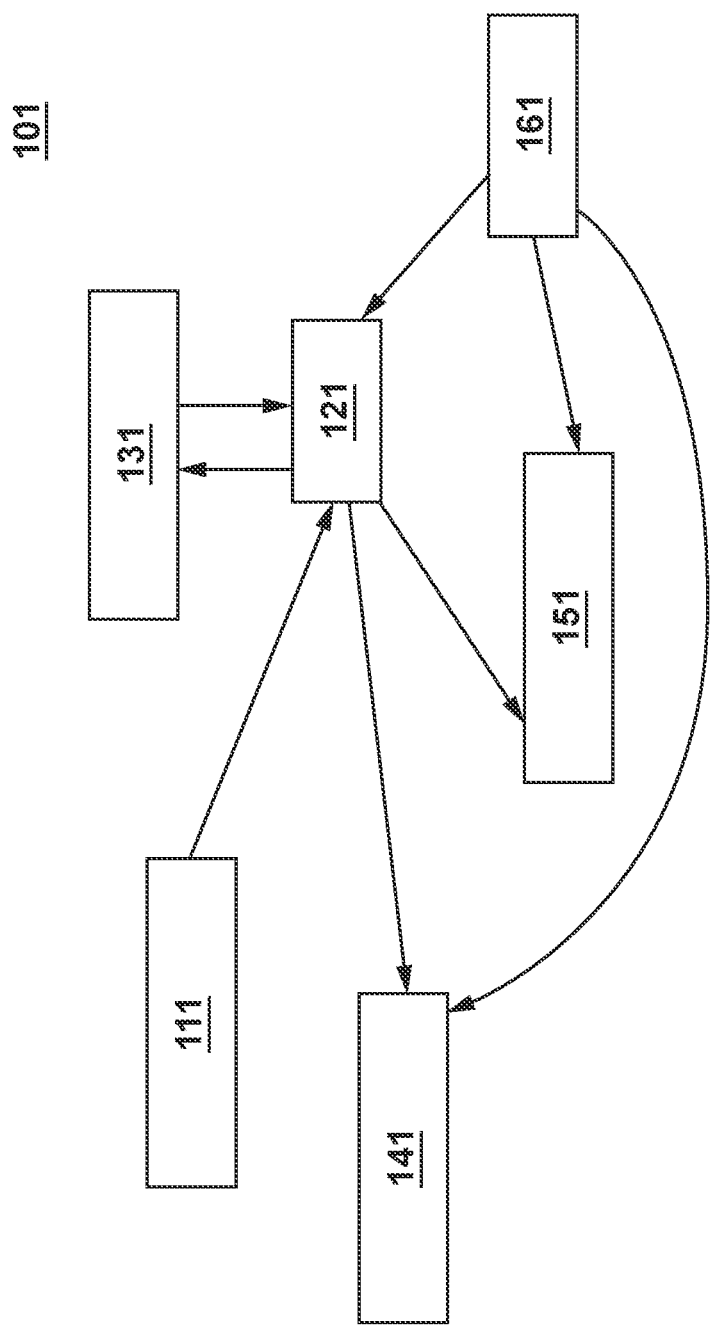
FIG. 2A illustrates a pedestrian footfall recording device consistent with embodiments herein.

FIG. 2A illustrates a schematic of a pedestrian footfall recording device consistent with embodiments herein. The pedestrian footfall recording device 101 includes an optical recognition device 111, a controller 121, a memory 131, an illumination device 141, a transmission device 151, and a power supply 161.

The optical recognition device 111 may include, for example, a camera configured to detect light of any frequency (IR, UV, etc.) The optical recognition device 111 may include any suitable camera hardware, including, for example, a CCD, CMOS, or any other suitable light capture technology. The optical recognition device 111 is configured to capture optical data.

The controller 121 is configured to receive the optical data from the optical recognition device 111. The controller 121 may include one or more processors. The controller 121 is further configured to record and store the optical data captured by the optical recognition device 111 in the memory 131. As discussed above, the optical data may include video and/or image data. The controller 121 stores the optical data in the memory 131 as optical data blocks including optical data corresponding to a predetermined amount of time. For example, the optical data blocks may include a pre-set length of video data (e.g., 1 minute, 2 minutes, 5 minutes, or any appropriate length) and/or a pre-set number of images (e.g., images corresponding to 1 minute of image capture, etc.).

In embodiments, the controller 121 is configured to store the optical data in an uncompressed format. Storage in an uncompressed format may be advantageous because it reduces the computational load and therefore reduces power consumption and permits the use of a less expensive controller 121 having lower processing capabilities. In further embodiments, the controller 121 may be configured to compress the optical data before storage on the memory (e.g., to save memory space) and/or before transmission (e.g., to reduce bandwidth requirements).

The transmission device 151 is configured to access the optical data stored on the memory 131 and transmit the optical data. The transmission device 151 may include at least one antenna and may be configured to transmit the optical data using any suitable wireless protocol (WiFi, 5G, 4G, LTE, 3G, Bluetooth, etc.) In embodiments, the transmission device 151 may be configured to operate by one or more wired protocols (ethernet, LAN, etc.) In embodiments, the transmission device 151 may transmit the optical data to the relay server 201, directly to the counting server 401, and/or to the relay server 201 or counting server 401 via one or more intermediate devices or waypoints.

In further embodiments, the controller 121 may be configured to transfer the optical data directly to the transmission device 151 (with or without compression) for transmission to the relay server 201 without intermediate storage in the memory 131.

The illumination device 141 may be configured to provide illumination in low-light conditions (e.g., nighttime, shade, etc.), and may include one or more of an infrared light, a visible light, a UV light, etc. In embodiments, the optical recognition device 111 may be functional to capture images in low-light conditions and the illumination device 141 may therefore be optional. The controller 121 may be configured to control the brightness and the on/off state of the illumination device (for example, according to light levels captured by the optical recognition device 111 and/or by timer, time of day, etc.).

The memory 131 may be any suitable memory or storage device as discussed herein. The power supply 161 may include a battery (rechargeable or otherwise) and/or a connection to wired power. In embodiments, the power supply 161 may include a solar powered supply.

Figure 2B:
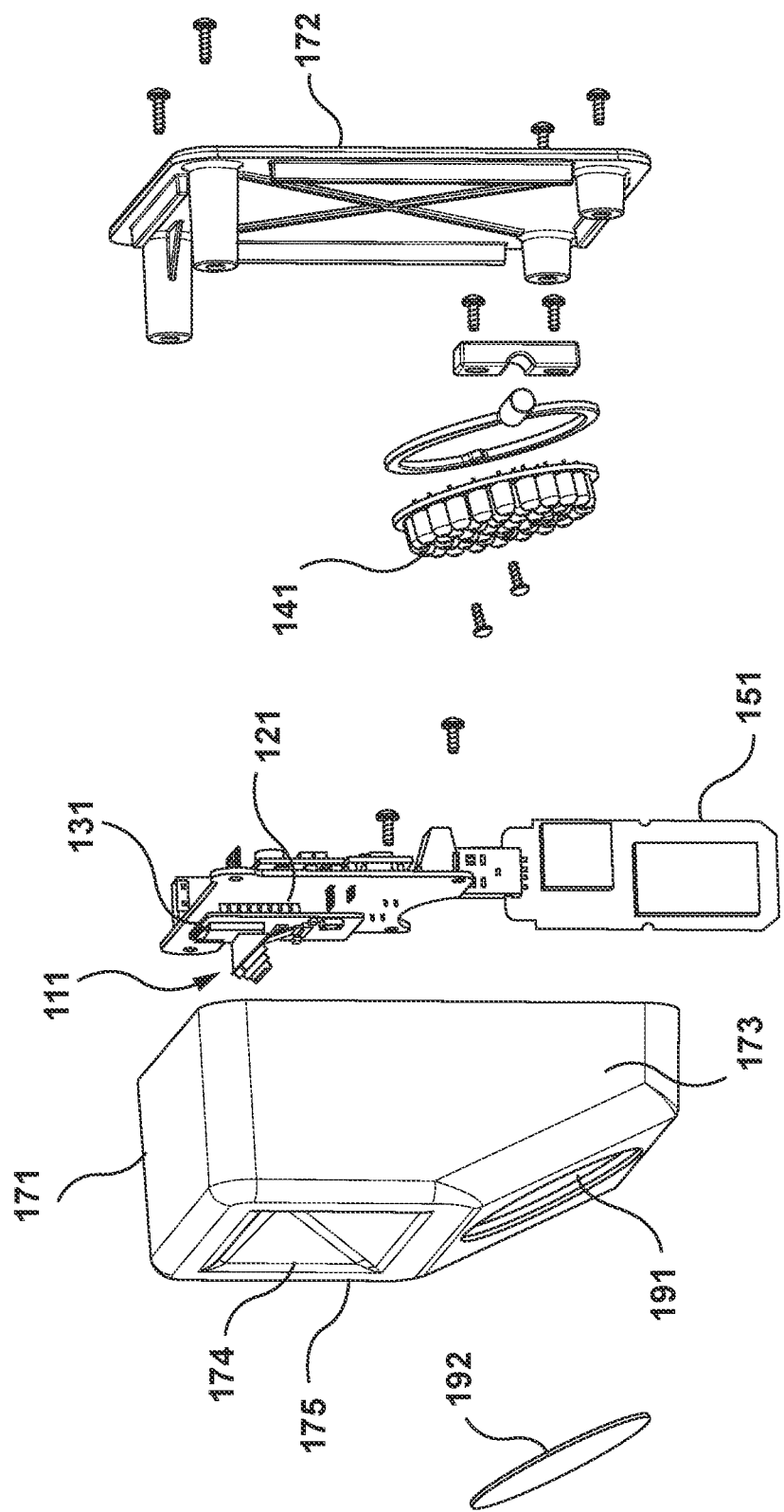
FIG. 2B illustrates hardware aspects of a pedestrian footfall recording device consistent with embodiments herein.

FIG. 2B illustrates example hardware aspects of a pedestrian footfall recording device consistent with embodiments herein. FIG. 2B illustrates examples of the optical recognition device 111, the controller 121, the memory 131, the illumination device 141, and the transmission device 151. Each of these components may be contained within a housing 171. The housing 171 may include an internal cavity 173 configured to contain the above components, a backing 172 configured to enclose the internal cavity 173, an illumination opening 191, an illumination window 192, and a recessed lens skirt 174.

In embodiments, the housing 171, as closed by the backing 172 is waterproof. The housing 171 includes an illumination opening 191 configured to permit the illumination device 141 to project light (in visible or invisible frequency ranges) outside of the housing 171. The illumination opening 191 may be covered by a translucent illumination window configured to permit the passage of light provided by the illumination device 141.

The housing 171 includes a lens skirt 174. The lens skirt 174 is positioned around the optical recognition device 111, providing a recess within which the optical recognition device 111 is disposed. The lens skirt 174 is configured with a planar edge 175. The planar edge 175 is defined by several edge surfaces surrounding the lens skirt 174 that are substantially coplanar. Accordingly, the planar edge 175 is configured such that substantially all of the planar edge 175 can contact a planar surface concurrently. As used herein, substantially coplanar means that the edge surfaces are coplanar within manufacturing tolerances. As used herein, substantially all of the planar edge 175 means more than 90%, more than 95%, more than 98%, and/or more than 99% of the planar edge 175 can contact a planar surface concurrently. The planar edge 175 permits the lens skirt to fully enclose the optical recognition device 111 against a planar surface (e.g., a glass window) without permitting significant light leakage through the sides. Thus, the lens skirt 174 may be configured to shield the optical recording device 111 from glare and/or excess light intrusion. The lens skirt 174 may be rigid and/or may be flexible, e.g., made from a soft plastic, rubber, or silicone material. In embodiments, the planar edge 175 may be configured with a face large enough to receive an adhesive material for mounting/sticking the pedestrian footfall recording device 101 to a window or other surface. In embodiments, the lens skirt 174 may include both rigid and flexible materials.

Figure 3A:
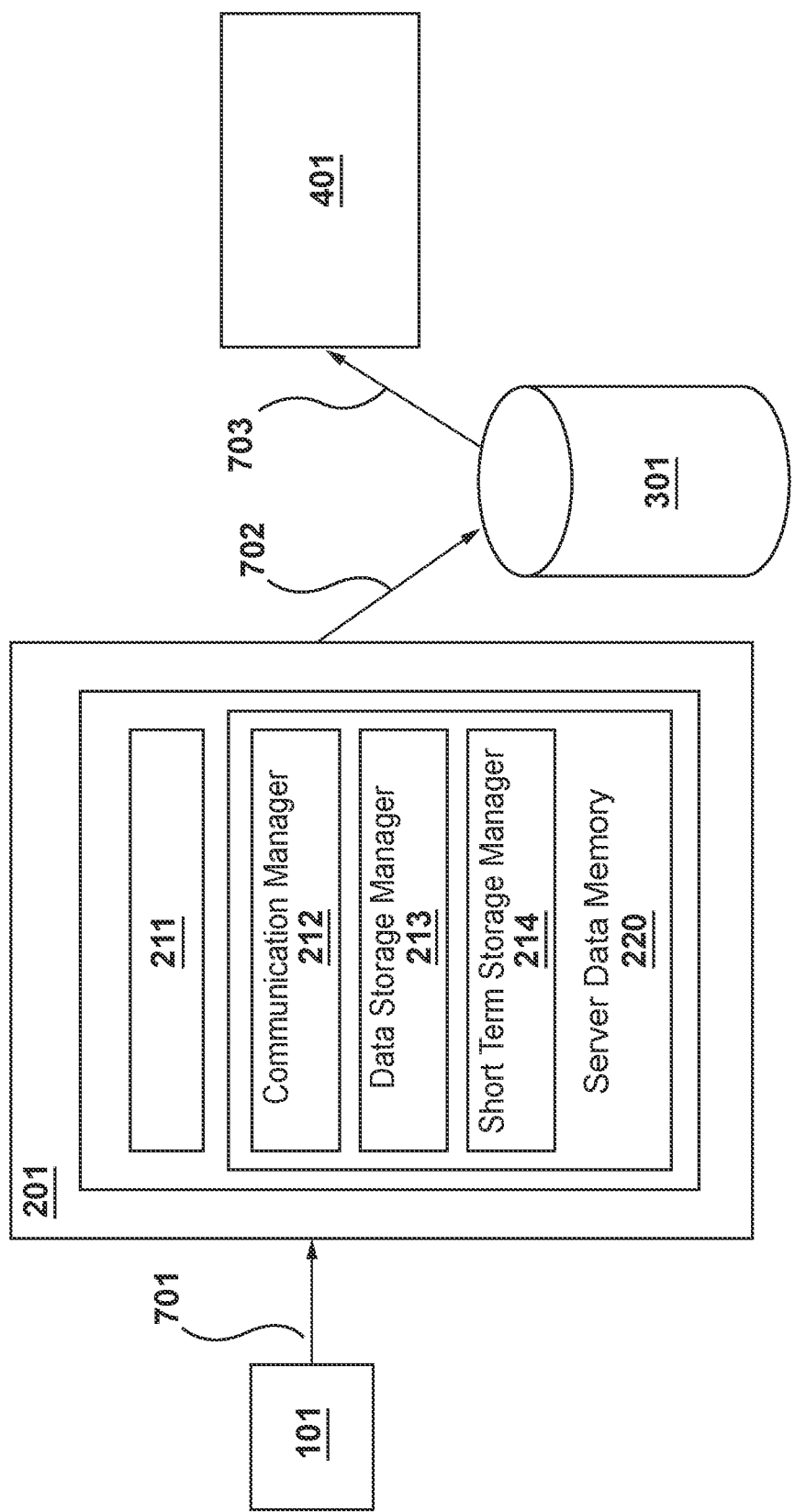
FIG. 3A illustrates a relay server consistent with embodiments herein.

FIG. 3A illustrates a relay server consistent with embodiments herein. The relay server 201 includes at least one processor 211 and a server data memory 220. The server data memory 220 includes software instructions for execution by at least one processor 211. The software instructions include at least software instructions for operating a communications manager 212, a data storage manager 213, and a short term data storage manager 214.

The communications manager 212 is a software module operational on the relay server. The communications manager is configured to manage communications between the relay server 201 and a plurality of pedestrian footfall recording devices 101. The communications manager 212 is configured to receive optical data transmitted by one or more pedestrian footfall recording devices 101 to the relay server 201 via the transmission pathway 701. In embodiments, pedestrian footfall recording devices 101 use HTTP via POST request over the transmission pathway 701 to transmit the optical data to the relay server 201. In embodiments HTTP POST may be selected for the convenience and high transfer speed enabled by permitting discrete optical data blocks to be uploaded, e.g., as FILE objects. In further embodiments, any other communication protocol may be used, including, for example, SCP, FTP, etc.

The short term storage manager 214 is a software module operational on the relay server 201. The short term storage manager 214 is configured to manage short term storage of the optical data blocks received by the relay server 201. The incoming optical data blocks may be stored in the local server data memory 220, which may include one or more high-speed memory devices, e.g., RAM, SSD, etc. The optical data blocks may also be stored in other memory devices, including hard disk drives and any other suitable memory medium. The optical data blocks may be stored in short term storage as they are received via the transmission pathway 701.

The data storage manager 213 is a software module operational on the relay server 201. The data storage manager 213 is configured to manage data storage of the optical data blocks received by the relay server 201. The data storage manager 213 manages the transfer of the received optical data blocks from the short term storage (e.g., server data memory 220) to the shared memory device 301. The optical data blocks may be transferred to the shared memory device 301 via the transmission pathway 702. The transmission pathway 702 may be wired or wireless and may be accomplished via any suitable transfer protocol.

Use of the relay server 201 provides several advantages to the pedestrian footfall quantification system 100. The processor 211 of the relay server 201 is dedicated to the receipt and storage of the received optical data blocks. The rate of transmission of the optical data blocks may vary and may occur at a relatively slow transmission rate. It may be difficult and/or a poor use of computational resources for the processor 211 to simultaneously manage receipt and storage of the optical data via the transmission pathway 701 and the processing of the optical data. While the processor 211 is occupied in employing the communications manager 212 to receive optical data from multiple pedestrian footfall recording devices 101, it may create a resource bottleneck to simultaneously perform the optical data processing. Thus, the relay server 201 and the counting server 401, discussed below, may operate separately from one another and permit computing resources to be compartmentalized and optimized for the specific tasks of data receipt and storage and data analysis.

In further embodiments, alternate arrangements of the pedestrian footfall quantification system 100 may be implemented. For example, the data storage manager 213 may store received optical data blocks directly in the shared memory 301 without a requirement for short term storage. In further embodiments, the relay server 201 may be omitted and the counting server 401 may directly receive and manage the optical data. In further embodiments, a single physical installation may include the functionality of the relay server 201 and the counting server 401, e.g., through the use of multiple CPUs and/or multiple cores of CPUs within the same physical system.

Figure 3B:
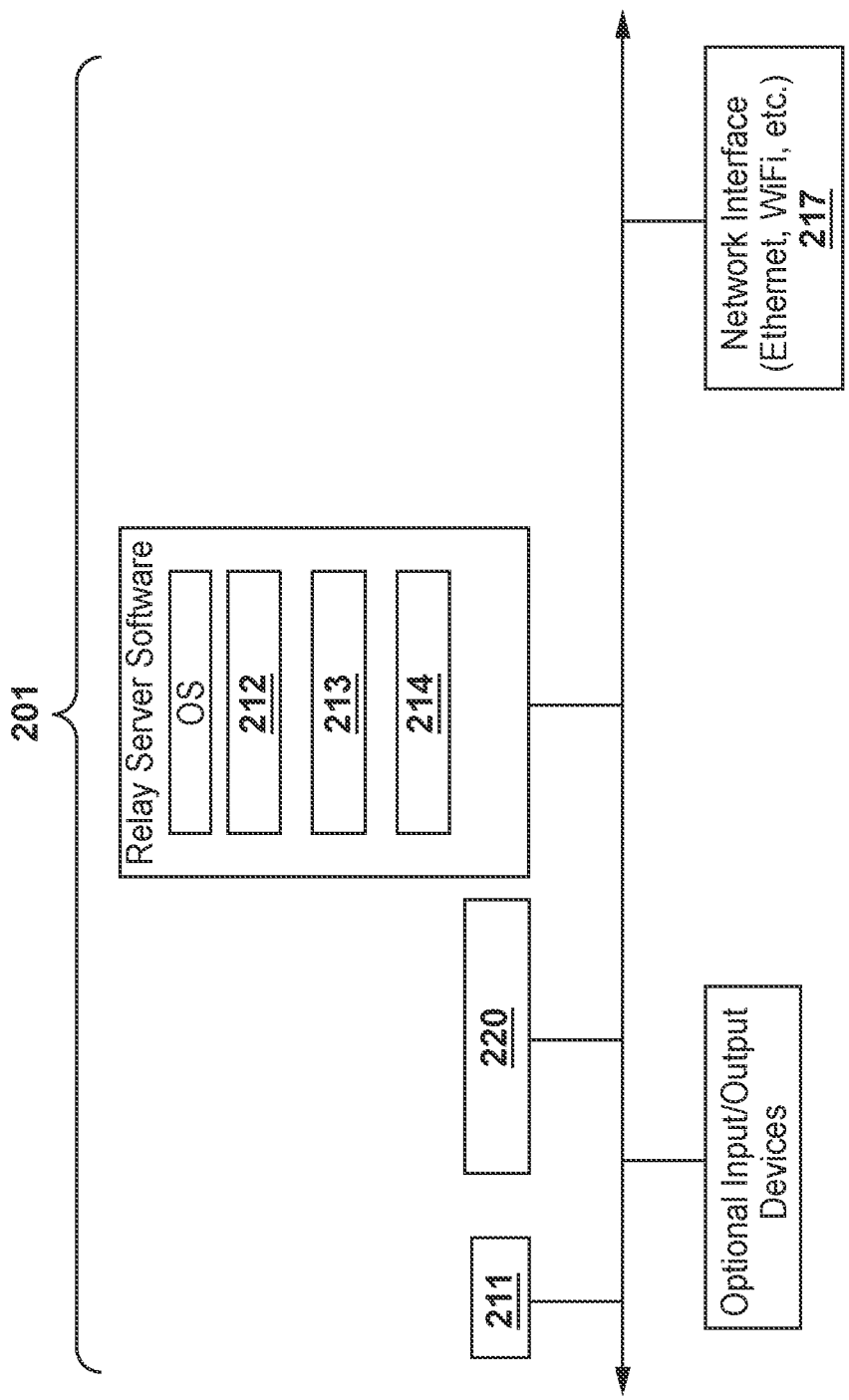
FIG. 3B illustrates hardware aspects of a relay server consistent with embodiments herein.

FIG. 3B illustrates hardware aspects of a relay server consistent with embodiments herein. The processor 211 may include, for example, a multi-core, multi-threaded CPU configured to handle incoming video data from multiple recording devices simultaneously. The processor may further include any suitable processing device or multiple processing devices consistent with this disclosure. For example, a plurality of single-core CPUs may be used to implement the functionality of the relay server 201. A network interface 217 configured to receive the optical data from the pedestrian footfall recording devices 101 and transmit the optical data to the shared memory 301 is further included. The network interface 217 may include any suitable wired or wireless networking components, as discussed herein.

Figure 4A:
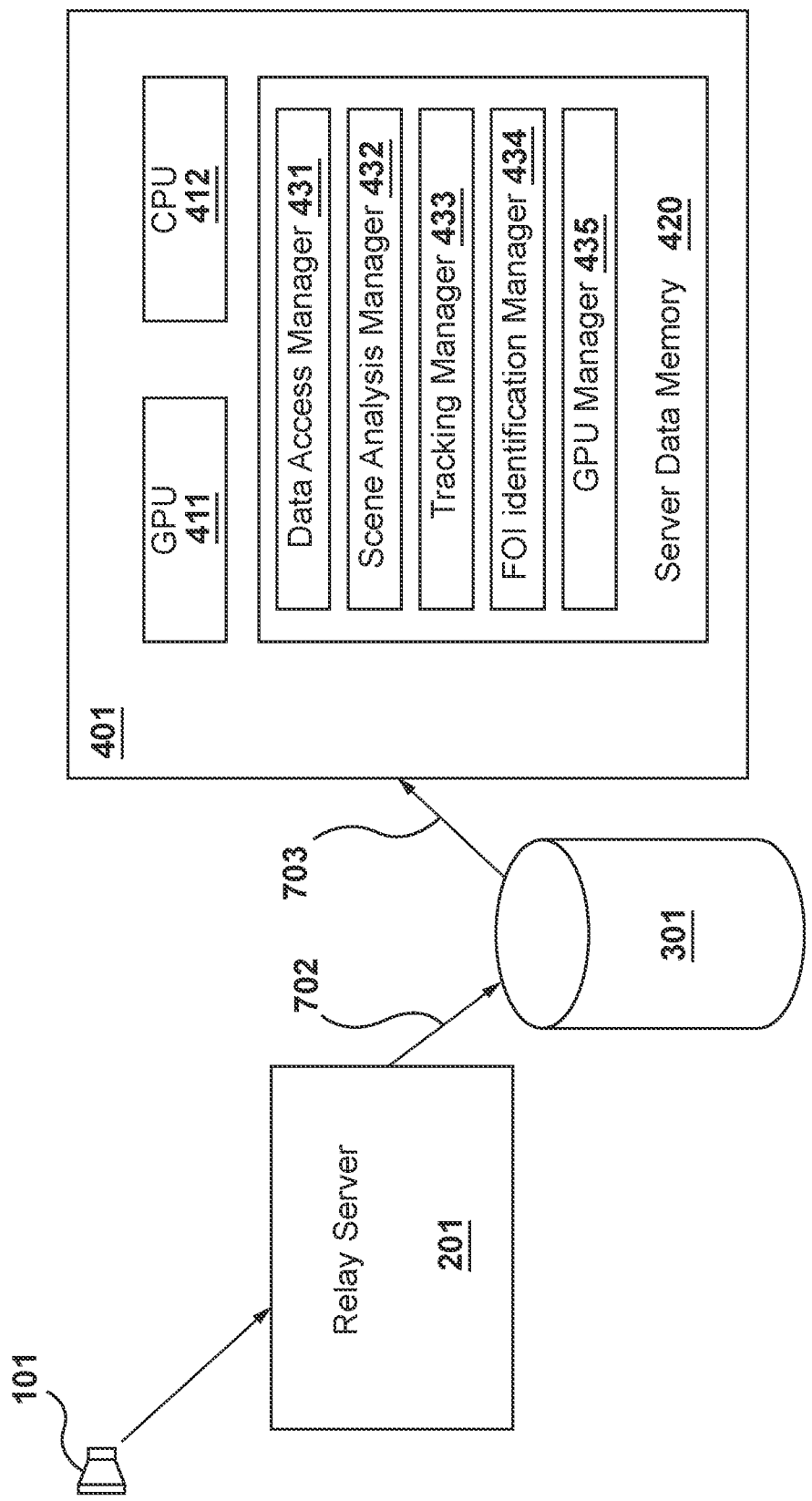
FIG. 4A illustrates a counting server consistent with embodiments herein.

FIG. 4A illustrates a counting server consistent with embodiments herein. The counting server 401 includes at least one first processor 411, at least one second processor 412, and a server data memory 420. The server data memory 420 includes software instructions for execution by the at least one first processor 411 and the at least one second processor 412. The software instructions include at least software instructions for operating a data access manager 431, a scene analysis manager 432, a tracking manager 433, a feature of interest (FOI) identification manager 434, and a GPU manager 435. Each of these managers may be implemented and be operational on either or both of the at least one first processor 411 and the at least one second processor 412.

In embodiments, operation of the various managers described herein on the different processors 411/412 described herein may provide specific advantages, as discussed below. Specifically, operating the various managers described herein on specific hardware (e.g., GPU vs CPU) of the counting server 401 may serve to improve the operation of the counting server 401 by increasing its ability to process the optical data and/or by reducing the resources necessary to process the optical data.

As discussed further below with respect to FIG. 4B, the at least one first processor 411 may include, for example, one or more graphics processing units (GPUs). The at least one second processor 412 may include one or more CPUs and/or one or more multi-core CPUs.

The data access manager 431 is a software module operational on the counting server 401. The data access manager 431 is configured to manage data access from the shared memory 301. The data access manager 431 is configured to obtain the optical data, e.g., optical data blocks, stored on the shared memory 301 via the transmission pathway 703 for use by the counting server 401. The transmission pathway 703 may be a wired or wireless communications pathway and may employ any suitable protocol. The obtained optical data may be stored in the server data memory 420, which may be implemented by any suitable data storage medium, including one or more of RAM, SSD, HDD, etc.

The scene analysis manager 432 is a software module operational on the counting server 401. The scene analysis manager 432 is configured to identify scene changes in the optical data. The scene analysis manager 432 may implement, for example, an algorithm that detects changes in pixels over a sequence of images, for example, Mog2. In the context of the pedestrian footfall quantification system 100, the scene analysis manager 432 may determine or identify a scene change in the optical data, which may be representative or indicative of movement, such as a pedestrian 102 in the field of view 103 of the pedestrian footfall recording device 101 from which the optical data was obtained. The scene analysis manager 432 may operate on an optical data block, e.g., a predetermined amount of optical data covering a specific time period. The scene analysis manager 432 may compare each frame of video to a previous frame of video to detect scene changes and/or in the case of sequential image data, may compare each image to a previous image to detect scene changes. In further embodiments, the scene analysis manager 432 may skip one or more frames or images between comparisons.

The scene analysis manager 432 is further configured to request feature of interest identification in the optical data. When the scene analysis manager 432 identifies or detects a scene change, the scene analysis manager 432 may request feature of interest identification of the frame or image in which the scene change was detected. The request for feature of interest identification may be directed to the GPU manager 435 (to be relayed to the FOI identification manager 434), as discussed in greater detail below. In embodiments, the scene analysis manager 432 may request feature of interest identification each time a scene change is detected. In embodiments, the scene analysis manager 432 may request feature of interest identification for only a subset (e.g., 1 in 2, 1 in 3, 1 in 4, 1 in 5, etc.) of frames in which a scene change is detected. For example, the scene analysis manager 432 may be configured to request feature of interest identification in every fifth frame in which a scene change is detected. In embodiments, the scene analysis manager 432 may be configured to stop operating when one or more features of interest has been detected to permit the tracking manager 433 to track the feature of interest. In embodiments, the scene analysis manager 432 may resume operation when no features of interest are present in a current frame of the optical data.

The tracking manager 433 is a software module operational on the counting server 401. The tracking manager 433 is configured to track the location and motion of features of interest in the optical data. The location of a feature of interest may include the coordinates of the feature of interest. The tracking manager 433 is configured to receive information representative of features of interest as detected by the FOI identification manager 434 and employ that information to update the locations of features of interest in the optical data. Thus, as various features of interest move into, out of, or within the field of view 103 of the optical data, the tracking manager 433 tracks their locations within the field of view 103. The tracking manager 433 may employ any suitable tracking algorithm, including, for example, Lucas-Kincade optical flow.

The tracking manager 433 may operate as follows. The tracking manager 433 receives information representative of one or more features of interest detected by the FOI identification manager 434 and stores this information. The tracking manager 433 tracks the multiple features of interest across frames, updating the stored locations of the features of interest. As each feature of interest is tracked from frame to frame, the tracking manager 433 implements a frame count associated with each feature of interest. The frame count represents a number of frames that the tracking manager 433 has tracked a feature of interest without confirmation from the FOI identification manager 434. For each feature of interest, the tracking manager 433 increments a frame count specific to that feature of interest each time the tracking manager 433 tracks that feature of interest in a new frame. If the tracking manager 433 is tracking at least one feature of interest, the tracking manager 433 will periodically (e.g., every 5 frames, although this could be more or fewer) request that the FOI identification manager 434 perform FOI identification of an image. If the information representative of features of interest returned by the FOI identification manager 434 corresponds to the location of a feature of interest tracked by the tracking manager 433, the tracking manager 433 resets the frame count for that feature of interest to zero, indicating that the FOI identification manager 434 has confirmed the feature of interest (e.g., as a person). Each feature of interest that the tracking manager 433 is tracking has its frame count updated to zero if confirmed by the FOI identification manager 434. If a feature of interest is not confirmed, the tracking manager 433 continues to increment the frame count. When the frame count reaches a threshold (e.g., 100 frames, although this may be more or fewer), the tracking manager 433 deletes the feature of interest and stops tracking it. This method leverages the computing analysis power of the FOI identification manager 434 (operating on the GPU 411) to periodically correct or update the tracking performed by the tracking manager 433. Thus, if the tracking manager 433 loses track of a feature of interest and begins updating locations based on another object identified in the images, the FOI identification manager 434 is able to provide correction.

The tracking manager 433 is further configured to update an FOI count for each optical data block. As features of interest move through the field of view 103, tracked by the tracking manager 433, the tracking manager 433 is configured to increment an FOI count when the features of interest pass a predetermined location within the field of view 103. For example, the tracking manager 433 may increment the FOI count when a feature of interest 103 has passed through a center of field of view 103. In embodiments, the predetermined location may be determined by a user. In embodiments, multiple predetermined locations may be employed, e.g., for features of interest entering or exiting the field of view 103 from different sides or angles of the field of view 103. The FOI count may be continuously updated and/or incremented to count all features of interest passing through the field of view over the time period encompassed by an optical data block. After completing processing of an optical data block, the FOI count is stored in a database and associated with the location, start time, and end time of the optical data block. This information may be transmitted to, obtained by, or otherwise made accessible to the client 501.

In embodiments, the tracking manager 433 may be configured to stop operating when no features of interest are detected to permit the scene analysis manager 432 to identify scene changes. In embodiments, the tracking manager 433 may resume operation when one or more features of interest are present in a current frame of the optical data. Thus, as each frame of the optical data is sequentially processed, it may, in some embodiments, be processed by either the scene analysis manager 432 (if no features of interest are currently being tracked) or the tracking manager (if one or more features of interest are currently being tracked). This system may improve overall computational efficiency, as the scene analysis manager 432 operates a scene-change detection algorithm that is less computationally intense than the tracking algorithms of the tracking manager 433.

The FOI identification manager 434 is a software module operational on the counting server 401. The FOI identification manager 434 is configured to identify people (e.g., pedestrians) in the optical data. The FOI identification manager 434 may employ an image recognition algorithm on the optical data to identify the people. In embodiments, the FOI identification manager 434 may employ the YOLOV3 algorithm to identify people within the optical data. In embodiments, the FOI identification manager 434 may employ alternative algorithms or methods, including neural networks, to identify people. In embodiments, the FOI identification manager 434 may be operational on the GPU 411. The people identified in the optical data images may be designated as features of interest, and information representative of the features of interest (e.g., location) may be passed back to the GPU manager 435 in fulfillment of requests made of the GPU manager 435.

The GPU manager 435 is a software module operational on the counting server 401. The GPU 435 manager is configured to manage operation of the GPU 411. The GPU manager 435 receives requests for feature of interest identification, e.g., from the scene analysis manager 432. The GPU manager 435 queues the requests from the scene analysis manager 432 and passes these requests (e.g., including pointers to images or video frames and/or the images of video frames themselves) to the FOI identification manager 434, operational on the GPU 411, as the GPU 411 has available processing resources. In embodiments, the FOI identification manager 434 is configured to process one FOI identification request at a time and the GPU manager 435 is configured to sequentially pass requests to the FOI identification manager 434 as the FOI identification manager completes previous requests.

The FOI identification manager 434 is further configured to operate in conjunction with the scene analysis manager 432 and the tracking manager 433, as managed by the GPU manager 435, to identify and track features of interest in the optical data. The scene analysis manager 432 may pass optical data in the form of individual video or image frames (or pointers to these) to the GPU manager 435. The GPU manager 435 passes the individual video or image frames to the FOI identification manager 434 operational on the GPU 411 as processing resources become available. The FOI identification manager 434 may pass FOI information identifying the locations of people (e.g., features of interest) in the individual video or image frames to the tracking manager 433. The tracking manager 433 may then employ the FOI information to update the features of interest being tracked. If the FOI identification manager 434 identifies a person in the optical data that does not correspond to a feature of interest being tracked, then the location of that person may be added to the features of interest data for future tracking by the tracking manager 433. If the FOI identification manager 434 identifies a person in the optical data that does correspond to a feature of interest being tracked, then the tracking manager 433 may update the features of interest data to indicate that a feature of interest is confirmed as a person, and the frame count for that feature is reset. If the FOI identification manager 434 fails to identify any persons or people in the optical data corresponding with one or more features of interest being tracked, those features of interest continue to have their frame counters incremented until reaching the frame count threshold. After reaching the frame count threshold, a feature of interest may be removed from the features of interest data by the tracking manager 433. In embodiments, a feature of interest may not be removed unless it has been analyzed by the FOI identification manager 434 multiple times without detection as a person, for example, two times, three times, four times, five times, ten times, fifteen times, twenty times, etc.

The counting server 401 may be configured to advantageously allocate software and hardware resources to increase the speed and/or lower the costs of pedestrian counting. As discussed above, the GPU 411 is configured to perform image analysis tasks, specifically, feature of interest identification. Such image analysis tasks may be resource intensive and may be best performed on the specific hardware platform provided by the GPU 411. GPUs, however, are relatively expensive compared to CPUs, such as the CPU(s) 412. Accordingly, the counting server 401 may employ one or more CPUS(s) 412 to instantiate the data access manager 431, scene analysis manager 432, tracking manager 433, and/or GPU manager 435. The CPU(s) 412 may include multiple cores capable of operating multiple threads and or may include a plurality of single core processors. Each of the multiple processing threads offered by the CPU(s) 412 may be employed to process one optical data block. Another processing thread may be employed to operate the GPU manager 435. The data access manager 431 may obtain the optical data block and the scene analysis manager 432 and tracking manager 433 may operate as discussed above. When it is necessary to perform an FOI identification task, i.e., a resource intensive task better suited to GPU processing, a request is made to the GPU manager 435, which then queues the request and passes it to the FOI identification manager 434 as the resources become available. The FOI identification manager 434, operational on the GPU 411, may perform FOI identification on optical data frames passed to it from multiple different CPU(s) 412, each processing different optical data blocks. Thus, the relatively more powerful GPU 411 may be leveraged for image processing across multiple different simultaneously occurring feature of interest counting processes operating on different CPU(s) 412.

Accordingly, the counting server 401 is configured to process multiple optical data blocks simultaneously via multiple CPUs 412 that each periodically leverage the GPU 411 to perform processing tasks better suited to the GPU 411. Thus, the processing power of the relatively more expensive GPU 411 may be employed selectively and advantageously by the relatively less expensive CPU(s) 412. Thus, the software and hardware architecture provided by the counting server 401 may permit the counting server 401 to simultaneously process received optical data from multiple pedestrian footfall recording devices 101 without employing GPU(s), at their greater cost as compared to CPUs, to each of the pedestrian footfall recording devices 101. Accordingly, the overall system performance of the pedestrian footfall quantification system 100 can be increased and the cost can be decreased through implementation of the hardware and software architecture of the counting server 401 as described herein.

Figure 4B:
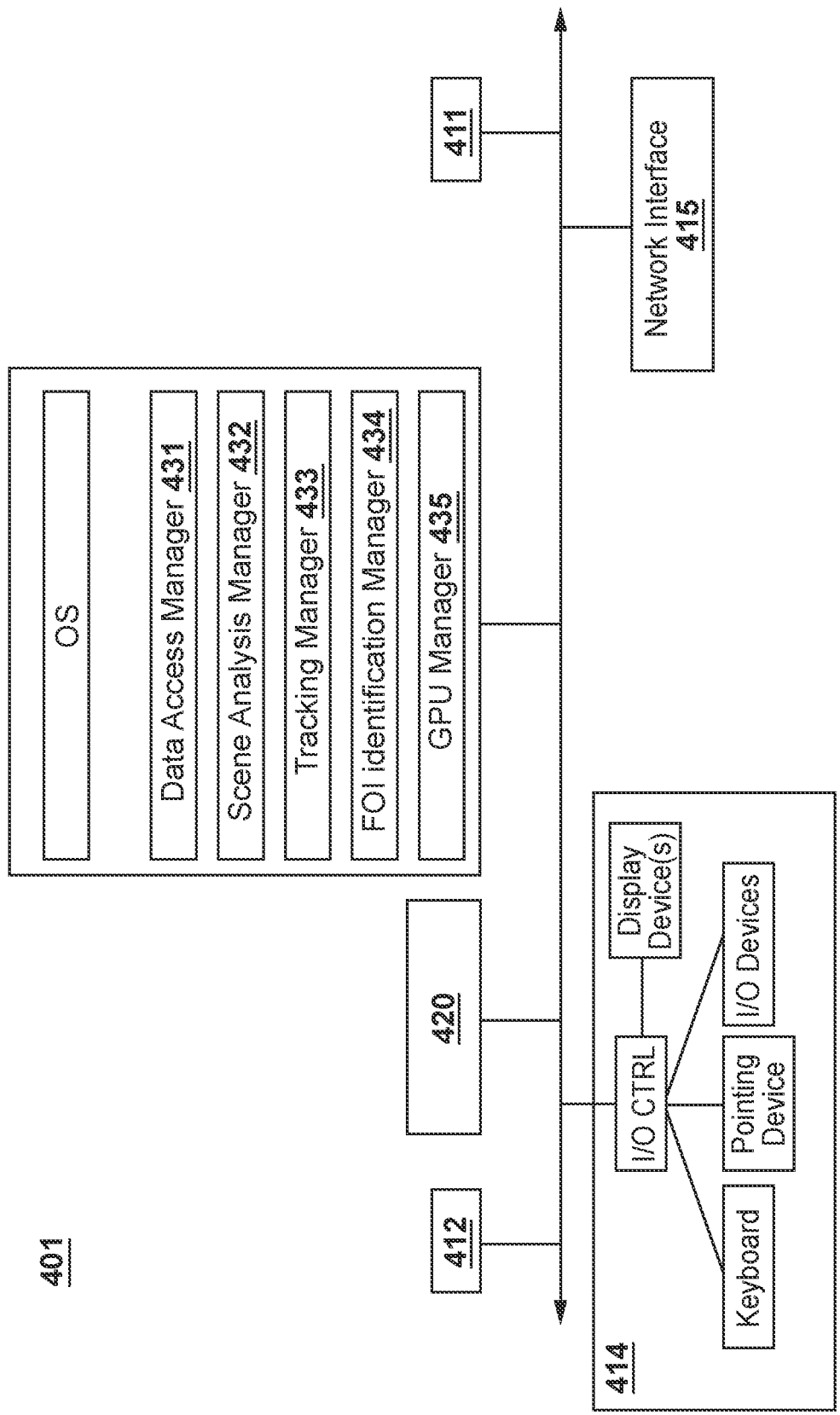
FIG. 4B illustrates hardware aspects of a counting server consistent with embodiments herein.

FIG. 4B illustrates hardware aspects of a counting server consistent with embodiments herein. The counting server 401 includes one or more CPUs 412. The one or more CPUs 412 may include one or more multi-core, multi-threaded CPUs as described herein and may be configured to carry out the functionality of the data access manager 431, the scene analysis manager 432, the tracking manager 433, and the GPU manager 435. The counting server 401 includes one or more GPUs 411. The counting server 401 may further include one or more interface devices 414, including displays, keyboard, pointing devices, etc. Further, the counting server 401 may include a network interface 415 configured to communicate with the shared memory 301. The network interface 415 may include any suitable wired or wireless networking components, as discussed herein. Finally, the counting server 401 may include a server data memory 420 including one or more memory devices, including, for example, SSDs, HDDs, RAM, and any other suitable memory medium.

Figure 5:
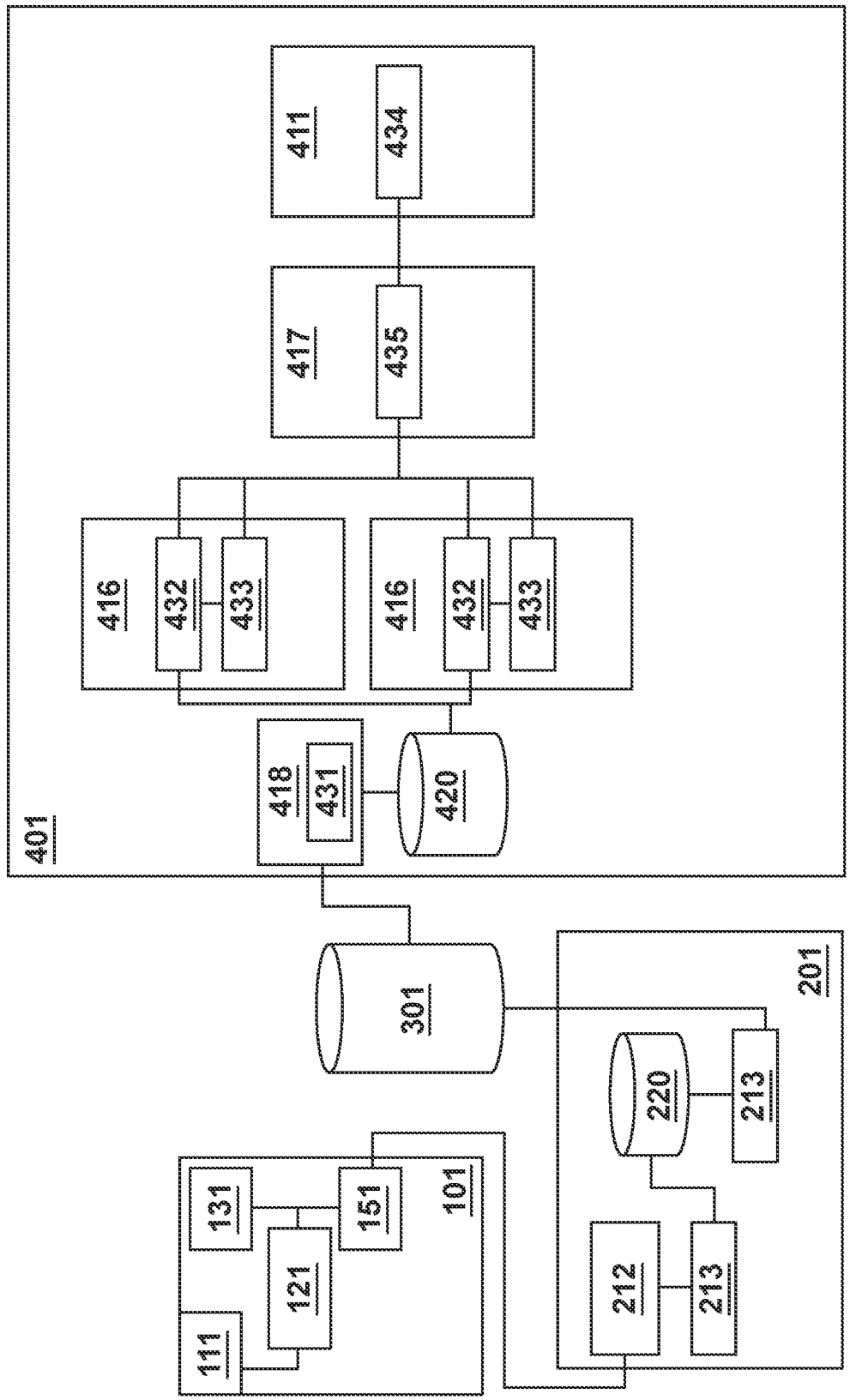
FIG. 5 illustrates a process flow for performing pedestrian traffic quantification consistent with embodiments herein.

FIG. 5 illustrates a process flow for performing pedestrian traffic quantification consistent with embodiments herein. The process begins with the capture of optical data by one or more pedestrian footfall recording devices 101, e.g., by the optical recognition devices 111 associated therewith. Within the pedestrian footfall recording devices 101, the optical data is stored, by the controller 121, to the memory 131 as optical data blocks. The controller 121 causes transmission of the optical data blocks from the memory 131 to the relay server 201 through utilization of the transmission device 151. This transmission can take place via ethernet, Wi-Fi or cellular data, etc., and/or any suitable communications technology. If the transmission fails due to the server being offline or other mishap, optical data blocks are not lost, as they are stored in memory, and can be transmitted when connection is resumed. As discussed herein, multiple pedestrian footfall recording devices 101 may be capturing and transmitting optical data concurrently.

The communications manager 212 on the relay server 201 handles the incoming data from the pedestrian footfall recording devices 101, storing the optical data blocks to RAM or other short term storage temporarily via the short term storage manager 214. The data storage manager 213 accesses the optical data blocks and transmits these to the shared memory 301. Transmission to the shared memory 301 may employ any suitable wired or wireless communications technology.

The counting server 401 is illustrated with multiple optical processing threads 416, a single GPU management thread 417, and a single data access thread 418. In embodiments, the threads 416, 417, and 418 may each be a single thread operating on one multithreaded single core CPU 412 (not shown), single threads operating on a separate single core CPU 412, single threads operating on separate multithreaded cores of a single multi-core CPU 412, single threads operating separately on single cores of a multi-core CPU, and/or any combination thereof. The counting server 401 may have further (not shown here) threads in operation for various tasks such as user interface, basic operating system, network interface management, and any other suitable task. The number of processors and threads illustrated in FIG. 5 is by way of example only. The counting server 401 may have additional or fewer threads and/or additional or fewer processors in operation.

The data access manager 431, operating on the data access thread 418, of the counting server 401 pulls the optical data blocks from the shared memory 301 and transfers these to server data memory 420 for local processing.

On the counting server 401, each optical processing thread 416 handles the processing of a single optical block data. Therefore, multiple optical data blocks are processed simultaneously by the multiple optical processing threads 416. Although two optical processing threads 416 are shown here, the counting server 401 may operate any suitable number of optical processing threads 416, e.g., 4, 8, 16, 32, 64, 128, etc., and may be limited only by hardware arrangements.

The processing of each optical data block in each optical processing thread 416 proceeds as follows. Control of each optical processing thread 416, at any given time, may be handled by either the scene analysis manager 432 or the tracking manager 433. The scene analysis manager 432 is configured to identify scene changes (e.g., potential features of interest) when there are no identified features of interest in the image frame. Thus, the scene analysis manager 432 handles control of the optical processing thread 416 when no features of interest are within the image frame. The scene analysis manager 432 is configured to analyze the optical data frame by frame to determine whether it is necessary to engage the FOI identification manager 434 to identify features of interest. After one or more feature of interest has been identified (e.g., by the FOI identification manager 434), the tracking manager 433 handles control of the optical processing thread 416 until all features of interest have left the current image frame.

A frame from an optical data block is obtained by the scene analysis manager 432 from local server memory 420. The scene analysis manager 432 detects whether a change in the image has occurred relative to the previous frame. If there is no change, the scene analysis manager 432 moves to the next frame. Otherwise, the frame associated with the change is passed to the GPU manager 435 for processing by the GPU 411 (e.g., the FOI identification manager 434). After passing the frame associated with the change to the GPU 411, the scene analysis manager 432 idles until it is required to obtain scene change information again.

The GPU manager 435 queues the image for processing by the FOI manager 434 (and thus the GPU 411). The GPU manager 435 handles requests for image frame analysis from multiple optical processing threads 416. The images are queued by the GPU manager 435 for processing and sequentially passed to the GPU 411 for processing by the FOI identification manager 434 as resources become available on the GPU 411. In embodiments, the GPU 411 and FOI identification manager 434 are configured to process one image frame at a time in sequential first-in first-out (FIFO) order. In further embodiments, the GPU 411 and the FOI identification manager 434 are configured to process multiple image frames concurrently so as to best utilize the available processing resources of the GPU 411. In further embodiments, the GPU 411 and the FOI identification manager 434 may be configured to process image frames in an order other than FIFO, e.g., according to a prioritization.

After analysis, the FOI identification manager 434 passes feature of interest identification information back to the GPU manager 435. If no feature of interest is found, the GPU manager 435 informs the scene analysis manager 432 of such and the scene analysis manager 432 continues to process frames looking for scene changes and passing these to the GPU manager 435. If a feature of interest is found by the GPU manager 435, the frame is then passed to the tracking manager 433 for tracking of the feature of interest. The tracking manager 433 then updates its record of features of interest based on the feature of interest identification information received. The tracking manager 433 then uses feature tracking to increment the positions of identified features of interest from frame to frame. If the position of a feature of interest crosses a certain position (e.g., center of sidewalk) within the field of view 103 of the frame, a footfall count is incremented (e.g., a person has passed). As the tracking manager 433 tracks features of interest in the frames, the tracking manager 433 periodically (e.g., once every 2, 3, 4, 5, 10, 20, etc. frames) passes these frames back to the GPU manager 435 for analysis by the FOI identification manager 434 to update identification of the features of interest in the frames. After passing a frame to the GPU manager 435, the tracking manager 433 idles until results are received from the GPU manager 435 or the tracking manager 433 is otherwise required to operate. Although the tracking manager 433 may pass every frame to the GPU manager, in embodiments, to reduce load on the GPU 411, only some frames are passed to the GPU manager 435. For example, every other frame, every third frame, every fourth frame, every fifth frame, etc.

After analysis of the frames passed to it by the tracking manager 433, the FOI identification manager 434 passes feature of interest identification information back to the GPU manager 435 which, in turn, passes the feature of interest identification information back to the tracking manager 433 that initially made the image analysis request. Features of interest not already accounted for are added to the feature of interest record while features of interest not identified as people, based on the frame count for each feature of interest, are removed from the feature of interest record. In embodiments, the tracking manager 433 may not eliminate a feature of interest from the feature of interest record until the feature of interest identification manager 434 fails to identify it multiple times.

The tracking manager 433 continues to track features of interest, with the assistance of the FOI identification manager 434. If the FOI identification manager 434 processes a frame and does not identify any features of interest, the GPU manager 435 then passes control back to the scene analysis manager 432. The scene analysis manager 432 then accesses a new image frame from scene analysis and returns to the beginning of the process.

When processing of an optical data block is completed, the full FOI count for that optical data block is stored in a local database on the counting server 401. The FOI count is stored with information representing location, start time, and end time associated with the optical data block that corresponds to the FOI count. On a periodic basis, the client 501 obtains the FOI count information.

Figure 6:
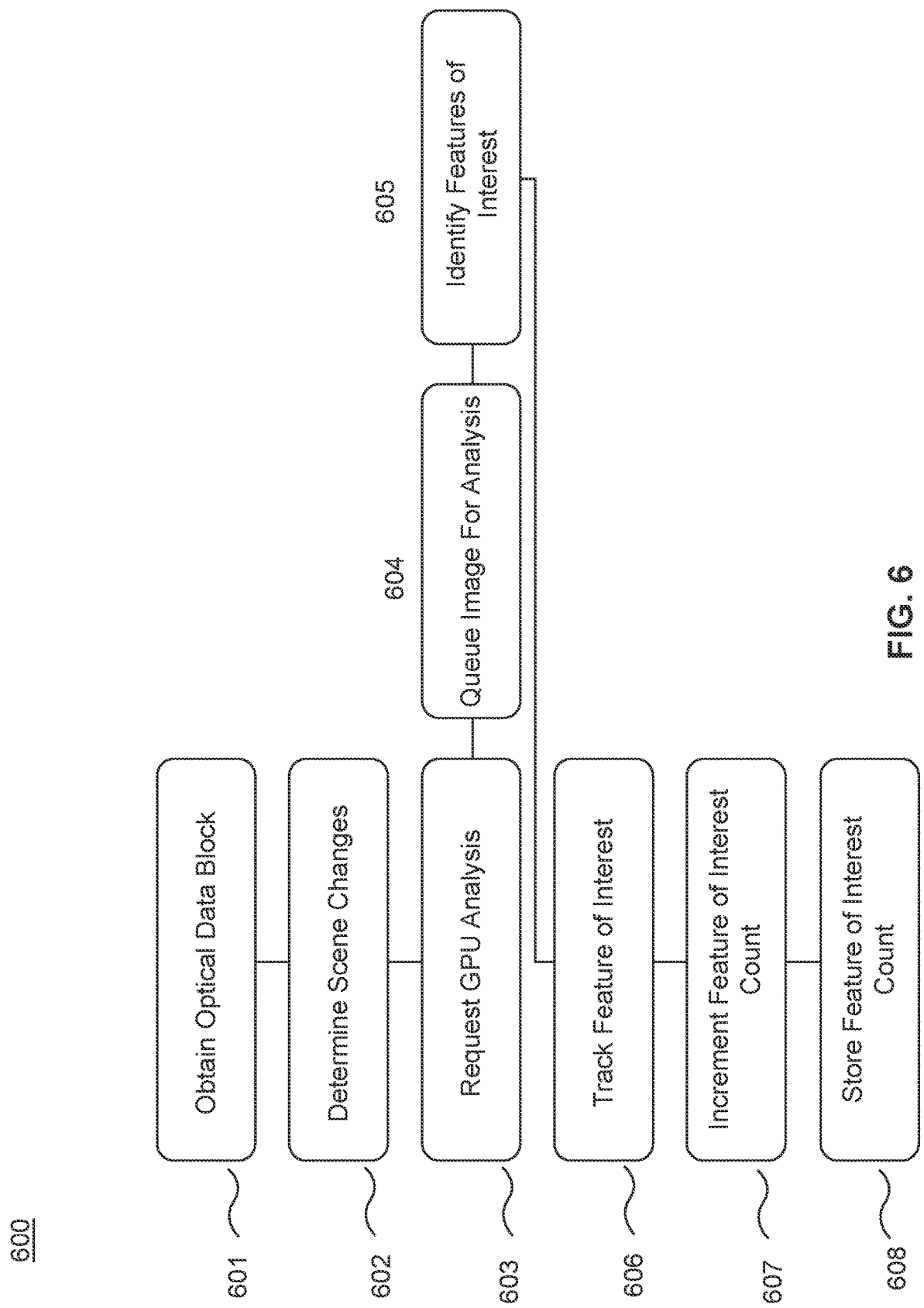
FIG. 6 illustrates a method of performing pedestrian foot traffic quantification consistent with embodiments herein.

FIG. 6 illustrates a method of pedestrian footfall quantification consistent with embodiments herein. The method 600 may be carried out by the software, hardware, and systems described herein. In particular, the steps and operations of the method 600 may be carried out on a counting server 401 as described herein. The method 600 includes operations carried out by data management thread(s), optical processing thread(s), GPU management thread(s), and GPU processing thread(s).

In an operation 601, the method 600 includes obtaining an optical data block by a data management thread in operation on a multi-threaded CPU of a counting server. The data management thread obtains an optical data block from a shared external storage device and transfers it to a local memory where it may be accessed by processes associated with the optical processing thread. The optical data block includes a plurality of optical frames.

In an operation 602, the method 600 includes determining scene changes in the optical data. A scene analysis manager, as part of the optical processing thread, reviews the images of the optical data block frame by frame to identify a frame in which a scene change (possibly indicative of a human presence) has occurred.

In an operation 603, the method 600 includes requesting GPU analysis. After identifying a scene change, the optical processing thread passes the image in which a scene change was identified to the GPU management thread, in operation on the multi-threaded CPU. The optical processing thread requests that the GPU management thread allocate GPU resources for analysis of a first optical frame of the optical data block associated with the scene change.

In an operation 604, the method 600 includes queuing the image for analysis by the GPU manager in operation in the GPU management thread. The GPU manager receives the image from the optical processing thread (as well as, potentially, additional images from other optical processing threads), and places the image in a queue for analysis by the GPU processing thread in operation on a GPU of the counting server. On a first-in first-out basis, the GPU manager passes images to the GPU processing thread as resources become available.

In an operation 605, an FOI identification manager in operation on the GPU management thread processes the received images to identify features of interest. The FOI identification manager processes each image and identifies one or more features of interest in the image and stores their locations. As the images are processed, the information about the features of interest (e.g., location of each feature), is passed back to the optical processing thread.

In an operation 606, a tracking manager in operation on the optical processing thread tracks features of interest in the optical data. The tracking manager receives, from the GPU processing thread, information representative of the features of interest passed to the GPU processing thread at operation 603. The tracking manager updates local storage of the features of interest and tracks the identified features of interest in image frames subsequent to the image frame passed to the GPU at operation 603.

In an operation 607, the tracking manager in operation on the optical processing thread increments a feature of interest count. As tracked features of interest cross a predetermined point in the optical frames subsequent to the first optical frame, the tracking manager increments an FOI count. Accordingly, the tracking manager counts features of interest as they cross through the optical frames, effectively keeping track or counting pedestrians that travel through the field of view of a pedestrian footfall recording device.

In an operation 608, the tracking manager in operation on the optical processing thread stores a total FOI count in a local server memory. After all optical frames in a particular data block have been processed, the tracking manager stores the FOI count associated with that data block in the local server memory with information indicative of the location, start time, and end time associated with the optical data block.

The terms "computer system," "computing device," and "computer" as may be used in the present application may include a variety of combinations of fixed and/or portable computer hardware, software, peripherals, mobile, and storage devices. These may include a plurality of individual components that are networked or otherwise linked to perform collaboratively or may include one or more stand-alone components. The hardware and software components of the computer system, computing device, and computer of the present application may include and may be included within fixed and portable devices such as desktop, laptop, and/or server. A module may be a component of a device, software, program, or system that implements some "functionality," which may be embodied as software, hardware, firmware, electronic circuitry, or etc.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single module or unit for purposes of clarity, it should be understood that the features and functions described herein may be performed by any combination of units or modules. Thus, various changes and modifications may be affected by one skilled in the art without departing from the spirit or scope of the invention as defined in the appended claim.

The examples of the systems and methods as described above are provided for illustrative purposes only and are not intended in any way to limit the scope or applicability of the present disclosure.

What is claimed is:

1. A computer implemented method of quantifying pedestrian footfall, the method to be carried out by a counting server including a CPU core with multithreading capability operating a plurality of CPU threads, and a GPU, the method comprising:
    obtaining by a first optical processing thread of the plurality of CPU threads a first optical data block;
    obtaining by a second optical processing thread of the plurality of CPU threads a second optical data block;
    determining, by the first optical processing thread, a scene change in the first optical data block;
    determining, by the second optical processing thread, a second scene change in the second optical data block;
    requesting, by the first optical processing thread, that a GPU management thread of the plurality of CPU threads allocate GPU resources for analysis of a first optical frame associated with the scene change;
    requesting, by second optical processing thread, that the GPU management thread allocate GPU resources for analysis of a second optical frame associated with the second scene change;
    allocating, by the GPU management thread, first GPU resources for analysis of the first optical frame and second GPU resources for analysis of the second optical frame;
    identifying, by the GPU, a feature of interest in the first optical frame;
    identifying, by the GPU, a second feature of interest in the second optical frame;
    tracking, by the first optical processing thread, the feature of interest in optical frames of the first optical data block subsequent to the first optical frame;
    tracking, by the second optical processing thread, the second feature of interest in optical frames of the second optical data block subsequent to the second optical frame;
    incrementing, by the first optical processing thread, an FOI count responsive to the feature of interest crossing a predetermined point in one of the optical frames; and
    incrementing, by the second optical processing thread, the FOI count responsive to the second feature of interest crossing the predetermined point in a second one of the optical frames.

2. The computer implemented method of claim 1, wherein the first optical data block is a video data block, the first optical frame is a video frame, and the optical frames are video frames.

3. The computer implemented method of claim 1, wherein the feature of interest is indicative of a pedestrian.

4. The computer implemented method of claim 1, further comprising obtaining, by a data management thread of the plurality of CPU threads, the first optical data block from an external storage device and storing the first optical data block in a local storage device.

5. The computer implemented method of claim 1, wherein tracking the feature of interest includes requesting, from the GPU management thread, allocation of GPU resources to update analysis of the feature of interest, the method further comprising:
    updating, by the GPU, analysis of the feature of interest.

6. The computer implemented method of claim 1, wherein the GPU management thread allocates GPU resources to features of interest identification tasks on a first in, first out basis.

7. The computer implemented method of claim 1, wherein the first optical processing thread waits for the feature of interest from the GPU before tracking the feature of interest.

8. The computer implemented method of claim 1, further comprising:
    tracking, by the first optical processing thread, a first plurality of additional features of interest in additional optical frames of the first optical data block; and
    tracking, by the second optical processing thread, a second plurality of additional features of interest in optical frames of the second optical data block.

9. A pedestrian footfall quantification system comprising:
    a plurality of pedestrian footfall recording devices configured to:
        obtain optical data and transmit the optical data;
    a relay server including at least one CPU configured to:
        receive the optical data transmitted by the plurality of pedestrian footfall recording devices;
        store the optical data in a storage device;
    a counting server, including at least a multi-threaded CPU operating a plurality of CPU threads, and a GPU and being configured to:
        obtain the optical data from the storage device;
        process the optical data to obtain a count of features of interest in the optical data,
    wherein processing the optical data includes:
        requesting, by a first optical processing thread of the plurality of CPU threads, that a GPU management thread of the plurality of CPU threads allocate GPU resources for analysis of a first optical frame,
        requesting, by a second optical processing thread of the plurality of CPU threads, that the GPU management thread allocate GPU resources for analysis of a second optical frame,
        allocating, by the GPU management thread, first GPU resources for analysis of the first optical frame and second GPU resources for analysis of the second optical frame,
        identifying, by the GPU, a feature of interest in the first optical frame, and
        identifying, by the GPU, a second feature of interest in the second optical frame.

10. The system of claim 9, wherein the features of interest include pedestrians.

11. The system of claim 9, wherein the counting server is configured for:
    obtaining by a first optical processing thread of the plurality of CPU threads a first optical data block from a storage device;
    determining, by the first optical processing thread, a scene change in the first optical data block;

requesting, by the first optical processing thread, that a GPU management thread of the plurality of CPU threads allocate GPU resources for analysis of a first optical frame associated with the scene change;
identifying, by the GPU, a feature of interest in the first optical frame.

* * * * *